J. H. BLEDSOE.
ASPHALT MIXING APPARATUS.
APPLICATION FILED SEPT. 24, 1912.
1,136,204.
Patented Apr. 20, 1915.
5 SHEETS—SHEET 1.
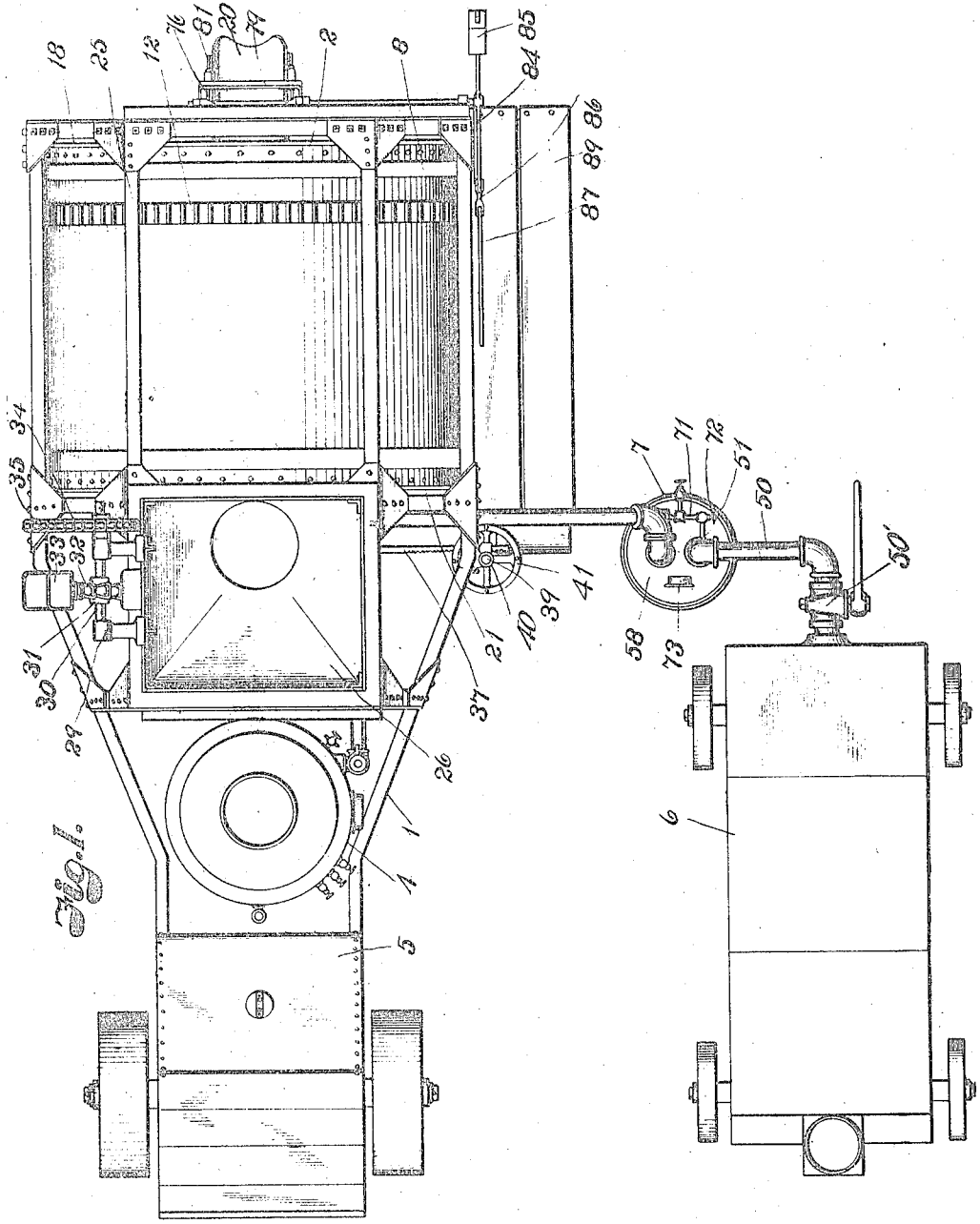
WITNESSES:
Arthur W. Capz.
Lewis L. Miller
INVENTOR
J. H. Bledsoe
BY
Arthur C. Brown,
ATTORNEY

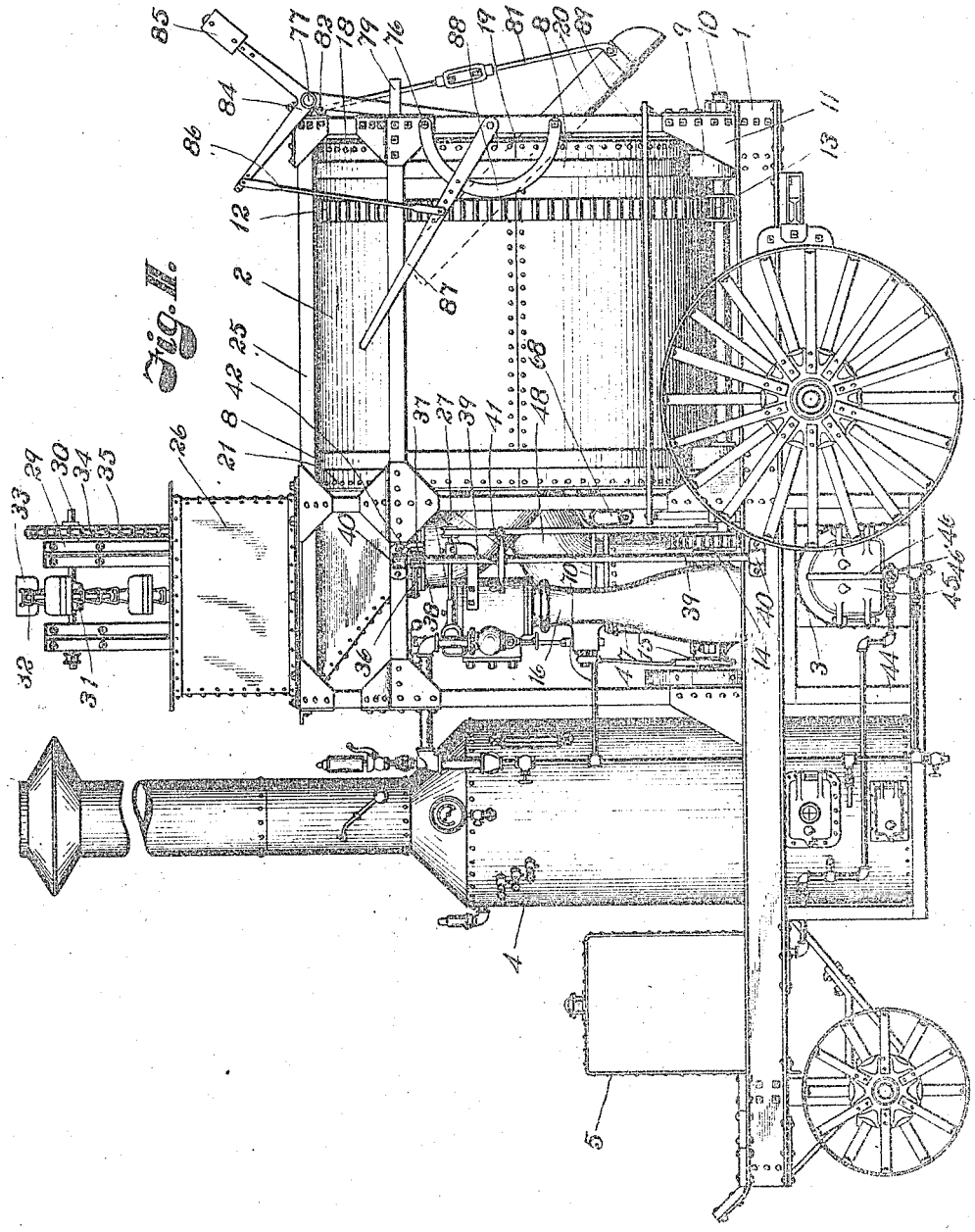

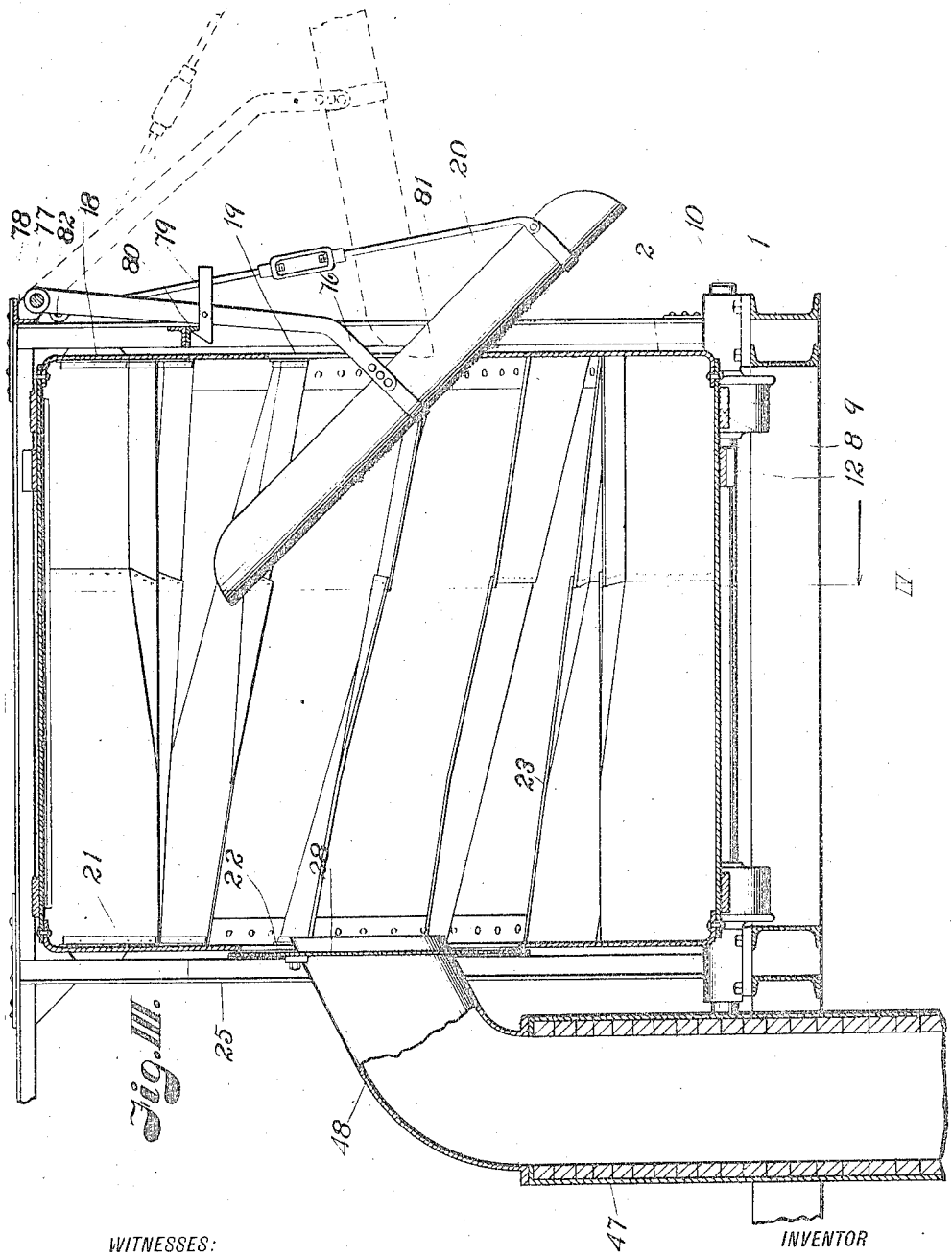

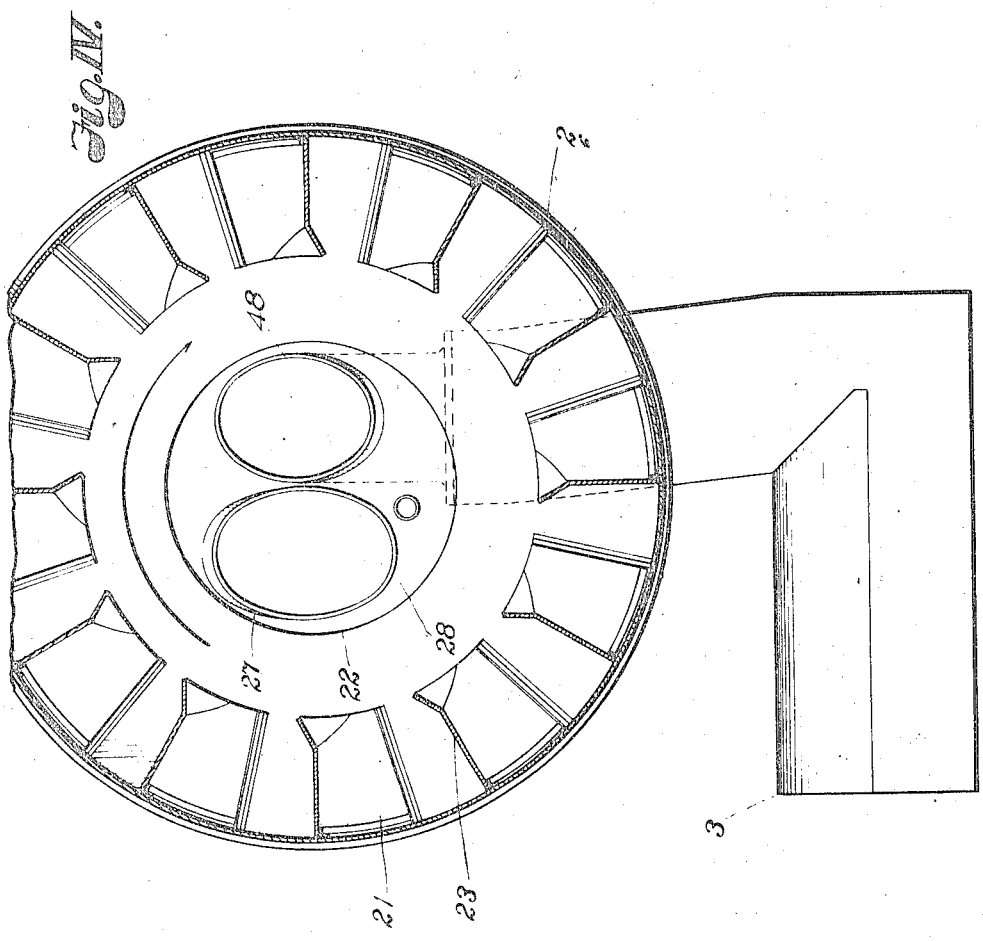
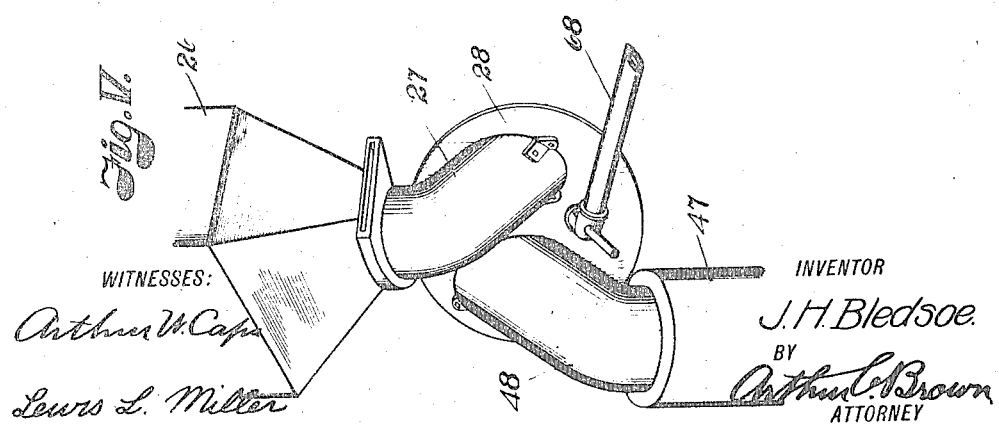

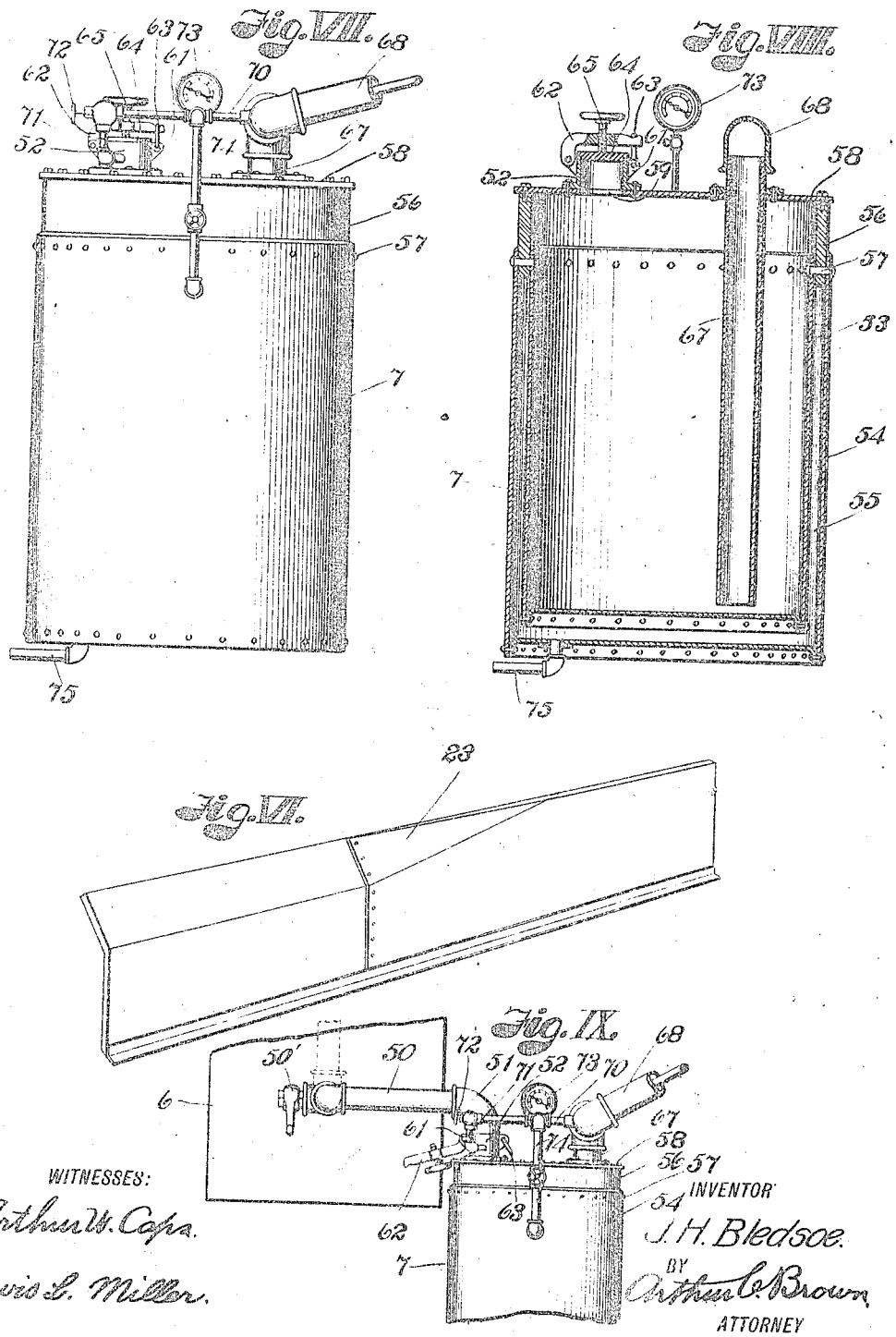

UNITED STATES PATENT OFFICE.

JOHN H. BLEDSOE, OF KANSAS CITY, MISSOURI, ASSIGNOR TO EQUITABLE ASPHALT MAINTENANCE COMPANY, OF KANSAS CITY, MISSOURI, A CORPORATION OF MISSOURI.

ASPHALT-MIXING APPARATUS.

1,136,204.

Specification of Letters Patent.

Patented Apr. 20, 1915.

Application filed September 24, 1912. Serial No. 722,046.

*To all whom it may concern:*

Be it known that I, JOHN H. BLEDSOE, a citizen of the United States, residing at Kansas City, in the county of Jackson and State of Missouri, have invented certain new and useful Improvements in Asphalt-Mixing Apparatus; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to asphalt mixing apparatus, and has for its principal object to provide an apparatus wherein fluid asphalt may be thoroughly and effectually mixed with a mineral aggregate to produce an efficient paving composition. In accomplishing this object, I provide means for accurately measuring the asphalt and mineral aggregate and for delivering same to the mixing drum in a manner to secure a thorough commingling of the ingredients and obviate variation of the composition.

I also provide novel means for maintaining the temperature of the fluid asphalt during its travel from the measuring tank to the mixing drum, whereby the asphalt is adapted for flowing freely through the supply pipe and for proper delivery into the mixing drum.

I also provide novel means for measuring the asphalt, conducting the fluid asphalt from the melting kettle to the measuring tank, and for delivering measured quantities of the asphalt to the mixing drum in a fluid state.

A particularly novel feature of the apparatus consists in the combination with the mixing drum, of the means for delivering the fluid asphalt, mineral aggregate and a hot blast to the mixing drum whereby an efficient mixture is produced, and in regulating such delivery in order that the mixture may be thorough.

It is also a further object of the invention to provide the improved details of structure for accomplishing the results heretofore mentioned, the preferred forms of which are illustrated in the accompanying drawings, wherein:—

Figure I is a plan view of an asphalt mixing apparatus constructed according to my invention. Fig. II is a side elevation of the mixer proper without the melting kettle and measuring tank. Fig. III is an enlarged vertical section of the mixing drum, the delivery chute being shown in inoperative position in dotted lines. Fig. IV is a cross-section of the drum on the line IV—IV, Fig. III. Fig. V is a perspective view of part of the mixing drum, showing the plate for covering the opening in the inner head, and parts of the feeding conduits. Fig. VI is a detail view of one of the mixing blades. Fig. VII is a detail view of the asphalt measuring tank. Fig. VIII is a vertical section of same. Fig. IX is a detail view of part of the measuring tank, showing the means for delivering asphalt thereto from the melting kettle.

Referring more in detail to the parts:— 1 designates a supporting frame upon which the mixing drum 2, blast oven 3, boiler 4 and fuel tank 5 are preferably carried, such frame being usually mounted on suitable running gear to render the plant or apparatus portable. An asphalt melting kettle 6 is preferably carried on a separate truck and a measuring tank 7 made detachable from the rest of the apparatus so that it may be carried by one of the trucks and easily connected with the supply and feed conduits.

The mixing drum 2 preferably comprises a cylindrical structure having peripheral rails 8 mounted on flanged rollers 9 which are carried by shafts 10 having journaled bearing in standards 11 on the truck frame 1. The drum is also provided with a peripheral rack 12 which meshes with a pinion 13 fixed on one of the shafts 10, and having gear connection 14 with a shaft 15 that is driven from the engine 16. The outer end of the drum has a head 18 fixed thereto and provided with a central opening 19 through which the inner end of a swinging delivery chute 20 is adapted to project, the inner end of the drum having a head 21 provided with a central opening 22 through which the mineral aggregate, blast and liquid asphalt supply conduits are adapted to deliver, as presently set forth. On the inner periphery of the drum are blades 23, the outer ends of which are turned forwardly to form shovels for carrying the mixture up to the top of the drum and delivering same in a cascade, either through the body of the drum or into the delivery chute, when the latter is projected into the drum.

Mounted on the frame 1, and inclosing the drum 2, is a super-structure 25, and mounted on the super-structure at the inner end of the drum is a hopper 26, the lower end of which carries a conduit 27 which is projected through the opening 22 in the inner drum head, the end of the conduit terminating slightly within the drum opening. Fixed to the end of the conduit is a plate 28 which is adapted for covering the opening 22 and extends slightly past the edges thereof, (Figs. III and IV).

Mounted on the hopper 26 are standards 29 having a shaft 30 journaled therein and provided with a sprocket wheel 31 over which a conveyer belt 32 is adapted for travel so that buckets 33 may carry mineral aggregate up to and deliver same into the hopper. A sprocket wheel 34 is fixed on the shaft and driven from a belt 35 which may receive its power from any suitable source, not shown, but preferably connected with the engine which is carried on the frame 1.

In the conduit 27 is a gate valve 36 whereby flow from the hopper may be completely stopped. The valve 36 is preferably operable from a rack 37 which extends horizontally past a pinion 38 on a vertical shaft 39 journaled in bearings 40 on the frame 25 and provided with a hand-wheel 41, whereby the rack may be operated to actuate the valve.

A bracket 42 is fixed on the frame 25 and braces the rack to hold same in proper relation to the pinion 38 to insure actuation of the rack and gate valve when the shaft 39 is revolved.

The heater 3 which is supported on a frame 44 suspended from the truck frame 1 comprises a suitable combustion chamber, preferably having fire doors 45 at one end and adapted for burning fuel oil, a supply pipe 46 for the burner 46' being extended to and connected with the tank 5. At the rear of the heater is a flue 47, preferably brick lined to near its upper end, and having a nozzle 48 extending at an upward incline through the plate 28 which lies over the opening 22 in the inner end of the mixing drum, so that heated air from the heater will be directed inwardly and upwardly toward the upper, outer corner of the drum.

The melting kettle 6, previously mentioned, may be of any suitable type and is provided with a swiveling nozzle 50, having a hood 51 adapted to lie over a collar 52 on the measuring tank 7, when the tank is to be filled, and having a valve 50' by which the gravity flow of fluid asphalt may be controlled.

The tank 7 comprises an inner receptacle 53 and an outer casing 54 which is spaced from the receptacle to provide a steam jacket 55 around the sides and bottom thereof, the spacing being accomplished by means of a ring 56 which is projected between the receptacle and casing at the upper edges thereof and through which the rivets 57 are projected, thereby serving not only as a spacer but also as a support for the inner receptacle, a head 58 being removably fixed on the ring 56 to close the top of the tank while affording access thereto. In the head 58 is an aperture 59, and fixed to the head, and registering with the aperture 58, is a collar 52 having ears 61 on opposite sides thereof to which the saddle 62 and link 63 are pivotally connected.

A cap 64 is adapted to seat at the top of the collar 52 and a set screw is carried by the saddle 62 and adapted to bear against the cap 64 in order to hold same firmly in place when the measuring tank is in use. It is the collar 52 over which the hood 51 of the swiveling nozzle on the melting kettle is adapted to lie when the tank is to be filled.

Extending through the head 58 is a tube 67, the lower end of which terminates near the bottom of the receptacle. Connected with the upper end of the tube 67 is a conduit 68 which extends to the inner end of the mixing drum and opens through the plate 28, the mouth of the conduit being located in the lower portion of the plate and directed downwardly so that fluid asphalt, when discharged therethrough, will be so directed through the drum that whatever part of the fluid is carried entirely through the drum chamber will strike the outer drum head below the opening 19 and thereby obviate loss of the material through the outer opening.

In order to prevent the asphalt from "freezing" during its travel through the conduit 68, I run a steam pipe 70 from the boiler 4 into the upper end of the conduit and through the conduit to near the measuring tank, so that when steam is run through the pipe, asphalt is kept hot during its travel through the conduit. The steam pipe 70 is run out of the conduit, adjacent the tank, and has a nozzle 71 opening into the side of the collar 52, so that the steam may be delivered into the tank and provide pressure for forcing fluid asphalt from the tank into the conduit and thence into the mixing drum, after first expanding in the feed collar. The exposed part of the pipe is provided with a valve 72 and steam gage 73 for cutting off the feeding supply and disclosing the steam pressure. On the pipe 70 is a branch 74 which opens into the space between the asphalt receptacle and casing to provide the steam jacket, and in the bottom of the casing is an exhaust nozzle 75 which forms a free outlet for the steam jacket in order that there may be a continuous flow of live steam through the jacket to warm the tank and keep the asphalt therein in a fluid state.

The delivery chute which I prefer to use as part of the apparatus comprises a trough-like member having hanger links 76 fixed thereto at about the center, the links being bent to form crank-like members which allow for the projection of the inner end of the trough into the drum to a greater extent than if said links were straight. The upper ends of the links are fixed on a shaft 77 which is revolubly mounted in brackets 78 on the frame 25, and pivotally mounted on one of the links above the drum opening is a latch 79 which is adapted for automatic engagement with a hook 80 on the frame 25 when the conduit is in its active position, in order to hold said chute against accidental displacement while the drum is being emptied. Fixed to the outer end of the chute are links 81, the upper ends of which are pivotally mounted on a shaft 82, also carried by the frame, the double or concentric mounting of the chute facilitating the proper projection thereof into the drum. Also fixed on the shaft 77, which carries the center hanger links, is a bell crank lever 84, having a weight 85 at one end and a link 86 connected therewith at the opposite end, the link 86 being adjustably connected with a lever 87, which is adapted for travel over a quadrant 88 on the frame 25 and whereby the delivery chute may be manipulated by an operator standing on the platform 89 on the frame 25.

In using the apparatus, presuming the parts to be constructed and assembled as described, a proper amount of mineral aggregate is delivered to the hopper 26 through the conveyer and at the proper time delivered from the hopper into the drum by opening the gate valve 36 and allowing the aggregate to drop through the conduit 27 into the drum. As the drum is in constant revolution when the apparatus is in use, the blades 23 thereof pick up the mineral aggregate, carry same to an upper position in the drum and deliver it in a cascade through the center of the drum chamber, thereby effecting a thorough mixture of the aggregate. While the drum is in revolution, and the aggregate being cascaded, as described, hot air from the heater 3 is delivered up through the flue 47—48 and at an upward incline through the drum chamber, the blast passing through the cascade of mineral aggregate and heating and drying same thoroughly, the blast impinging against the upper portion of the outer drum head, and being deflected backwardly into the chamber in order that the heated air may not escape through the outer head opening, until it has circulated through the drum and absorbed a maximum amount of moisture.

When the drum is charged with the mineral aggregate, the measuring tank 7 is filled with fluid asphalt from the melting kettle 6, by opening the collar 52 and lowering the swiveled nozzle 50 to bring the hood 51 over the cap and allow asphalt from the melter to flow by gravity into the tank. As soon as the tank is full, the nozzle is again lifted and the cap 63 screwed onto the collar to firmly close the latter. The valve 72 on the steam pipe is then opened to admit steam to the top of the receptacle, the pressure from which forces the contents of the tank up through the tube 67 and conduit 68, from which it is delivered as a jet into the drum and mixed with the mineral aggregate. The downward incline of the jet mouth directs the flow of asphalt downwardly and outwardly through the cascade so that any material which may be thrown entirely through the drum will strike against the outer head and fall back into the drum chamber and mix with the mineral aggregate instead of escaping through the opening in the head. As the jet of asphalt passes through the material cascading in the drum, it is mixed therewith so that when the combination falls to the bottom of the drum it is carried up by the blades and the entire mass cascaded to thoroughly mix the asphalt and mineral aggregate.

Under ordinary conditions, a pressure of twenty-five pounds in the measuring tank will throw the jet of asphalt entirely through the cascade, and, in order to secure a proper mixture throughout the entire fall of mineral aggregate, the pressure may be regulated by the valve 72, it having been found from experience that with a measuring tank containing fifty-two gallons and a two-inch conduit, twenty pounds of steam will force the liquid asphalt to about the center of the drum, and fifteen pounds will carry it only a short distance into the drum. By manipulating the valve to vary the pressure between fifteen and twenty-five pounds a thorough mixture may be secured.

When the mixing operation is completed, the steam valve 72, and the mineral aggregate valve 36 are closed and the chute 20 rocked to project its inner end into the drum, so that the mixture dropping from the top of the drum will be delivered in the chute and therethrough into a wagon, or other receptacle.

While the batch is being mixed, the hopper is filled with a new supply of mineral aggregate, so that as soon as the drum is emptied and the chute removed a new charge may be delivered into the drum and the operation described repeated.

If for any cause it should be impossible to empty the drum immediately after the mixture has been completed, the blast of hot air may be cut off to obviate over-heating the mixture, and, if desired, the drum may be stopped. If the batch should remain in the drum for some time it is desirable to reheat the mixture in the drum before withdrawing same therefrom, in order that the material may be in proper condition to lay on a street.

It is apparent that with an apparatus of this description, not only may the mineral aggregate be thoroughly dried before receiving the aggregate, but the entire batch is dried in the mixer, thereby removing any moisture which might have been carried in from the steam used for forcing the fluid asphalt from the measuring tank to the mixing drum. It is also apparent that by injecting the asphalt into a shower of hot mineral aggregate, and eliminating flame from the drum, the asphalt is taken up and absorbed by the aggregate, and explosions in the mixer obviated.

Having thus described my invention, what I claim as new therein and desire to secure by Letters-Patent, is:—

1. In an asphalt mixing apparatus, the combination with a mixing drum, of a melting kettle, a sealed measuring tank, means for conducting fluid binder from the kettle to the tank, connection between the tank and drum, and means for delivering a fluid pressure medium to the tank, whereby a measured quantity of fluid binder is delivered from the tank to the mixing drum.

2. In an asphalt mixing apparatus, the combination with a drum, of a measuring tank, a conduit leading from the tank to the drum, a melting kettle, a conduit for delivering fluid binder from the kettle to the measuring tank by gravity, means for sealing the kettle conduit, and means for delivering a fluid pressure medium to the measuring tank, whereby the measured contents thereof are forced to the drum, substantially as set forth.

3. In an asphalt mixing apparatus, a mixing drum, means for delivering mineral aggregate to the drum, a separate measuring tank, a collar above and communicating with the tank, a conduit leading from the tank to the drum, and a steam pipe running through the conduit and opening into the collar, for the purpose set forth.

4. In an asphalt mixing apparatus, a mixing drum, means for delivering mineral aggregate to the drum, a separate measuring tank, a conduit opening from the bottom of the tank and running to the drum, a steam pipe running through the exposed portion of the conduit and opening into the top of the tank, and a regulating valve on the steam pipe, for the purpose set forth.

5. In an asphalt mixing apparatus, a mixing drum, means for delivering mineral aggregate to the drum, a measuring tank comprising spaced inner and outer receptacles, a conduit leading from the inner receptacle to the drum, means for conducting a pressure medium to the top of the tank, and inlet and outlet members adapted for affording a continuous flow of heating medium through the space between the inner and outer tank members, for the purpose set forth.

6. In an asphalt mixing apparatus, a mixing drum, means for delivering mineral aggregate to the drum, a measuring tank comprising spaced inner and outer receptacles, a conduit leading from the inner receptacle to the drum, a steam pipe running through the conduit and opening into the top of the tank, a branch on the steam pipe opening into the space between the receptacles, and an outlet in the bottom of the outer receptacle, for the purpose set forth.

In testimony whereof I affix my signature in presence of two witnesses.

JOHN H. BLEDSOE.

Witnesses:
 LEWIS H. MILLER,
 LETA E. COATS.